US010291735B2

(12) United States Patent
Coglitore et al.

(10) Patent No.: US 10,291,735 B2
(45) Date of Patent: May 14, 2019

(54) RESIDENTIAL CACHE APPLIANCE UTILIZING A SOCIAL NETWORK

(71) Applicant: Facebook, Inc., Menlo Park, CA (US)

(72) Inventors: Giovanni Coglitore, Saratoga, CA (US); Narsing Vijayrao, Santa Clara, CA (US)

(73) Assignee: Facebook, Inc., Menlo Park, CA (US)

( * ) Notice: Subject to any disclaimer, the term of this patent is extended or adjusted under 35 U.S.C. 154(b) by 445 days.

(21) Appl. No.: 14/338,994

(22) Filed: Jul. 23, 2014

(65) Prior Publication Data
US 2016/0028846 A1    Jan. 28, 2016

(51) Int. Cl.
H04L 29/06    (2006.01)
H04L 29/08    (2006.01)
H04L 29/12    (2006.01)

(52) U.S. Cl.
CPC ........ *H04L 67/2842* (2013.01); *H04L 65/403* (2013.01); *H04L 67/26* (2013.01); *H04L 67/2814* (2013.01); *H04L 61/1511* (2013.01)

(58) Field of Classification Search
CPC ... H04L 67/2842; H04L 65/403; H04L 67/26; H04L 67/2814; G06F 17/30; G06F 17/30206
USPC ........ 709/203, 204, 217, 226; 715/209, 716; 382/100
See application file for complete search history.

(56) References Cited

U.S. PATENT DOCUMENTS

| | | |
|---|---|---|
| 5,864,837 A | 1/1999 | Maimone |
| 6,941,338 B1 | 9/2005 | Madsen et al. |
| 6,957,212 B2 | 10/2005 | Peng et al. |
| 7,069,328 B1 | 6/2006 | Bell et al. |
| 7,099,927 B2 | 8/2006 | Cudd et al. |
| 7,359,933 B1 | 4/2008 | Polen et al. |
| 7,574,481 B2 | 8/2009 | Moore et al. |
| 7,743,022 B2 | 6/2010 | Kaasten et al. |
| 7,865,463 B2 | 1/2011 | Sollicito et al. |

(Continued)

FOREIGN PATENT DOCUMENTS

JP    2003008664 A    1/2003

OTHER PUBLICATIONS

Non-Final Office Action dated Feb. 12, 2016, in U.S. Appl. No. 14/152,166 of Gupta, V., et al., filed Jan. 10, 2014.

(Continued)

*Primary Examiner* — David R Lazaro
*Assistant Examiner* — Zi Ye
(74) *Attorney, Agent, or Firm* — Van Pelt, Yi & James LLP

(57) ABSTRACT

Embodiments are disclosed for managing a distributed data center. The managing can include receiving content interaction history associated with a first social networking account of a social networking system at a content distribution system; maintaining a cache map of available cache appliances to implement a distributed cache store; selecting a content item to push to a residential cache appliance based on the content interaction history, wherein pushing the content item includes updating the cache map to associate a network address of the residential cache appliance with an identifier of the content item; and providing a content distribution service configured to redirect a content streaming request for the content item to the residential cache appliance when the content item is determined to be available in the distributed cache store according to the cache map.

20 Claims, 7 Drawing Sheets

(56) References Cited

U.S. PATENT DOCUMENTS

| | | | |
|---|---|---|---|
| 8,255,921 | B2 | 8/2012 | Arvidsson et al. |
| 8,279,780 | B2 | 10/2012 | Yamamoto |
| 8,316,098 | B2 | 11/2012 | Luna et al. |
| 8,601,090 | B1* | 12/2013 | Richardson .............. H04L 29/00 709/217 |
| 8,788,475 | B2 | 7/2014 | Fredricksen et al. |
| 8,812,651 | B1 | 8/2014 | Rennie et al. |
| 9,015,269 | B2 | 4/2015 | Bellessort et al. |
| 9,055,124 | B1 | 6/2015 | Hill et al. |
| 9,189,510 | B2 | 11/2015 | Song et al. |
| 9,229,740 | B1 | 1/2016 | Allen et al. |
| 2001/0030469 | A1 | 10/2001 | Tsujikado et al. |
| 2002/0087797 | A1 | 7/2002 | Adrangi et al. |
| 2002/0160773 | A1 | 10/2002 | Gresham et al. |
| 2002/0178330 | A1 | 11/2002 | Schlowsky-Fischer et al. |
| 2003/0063770 | A1* | 4/2003 | Svendsen .......... G06F 17/30206 382/100 |
| 2003/0084091 | A1 | 5/2003 | Agarwalla et al. |
| 2003/0101267 | A1* | 5/2003 | Thompson .............. H04L 29/06 709/227 |
| 2004/0128346 | A1 | 7/2004 | Melamed et al. |
| 2004/0167967 | A1 | 8/2004 | Bastian et al. |
| 2005/0102300 | A1 | 5/2005 | Madsen et al. |
| 2005/0188304 | A1* | 8/2005 | Lawton .............. G06F 17/30716 715/209 |
| 2005/0234864 | A1* | 10/2005 | Shapiro ................ H04L 67/104 |
| 2006/0010225 | A1 | 1/2006 | Issa et al. |
| 2006/0167979 | A1* | 7/2006 | Fuchs .............. G06F 17/30902 709/203 |
| 2007/0010245 | A1 | 1/2007 | Levitan et al. |
| 2008/0005195 | A1 | 1/2008 | Li |
| 2009/0100268 | A1 | 4/2009 | Garcia et al. |
| 2009/0125391 | A1* | 5/2009 | Toutonghi ............ G06Q 20/102 705/14.69 |
| 2009/0132640 | A1* | 5/2009 | Verma ................ G06F 17/30864 709/203 |
| 2009/0168795 | A1 | 7/2009 | Segel et al. |
| 2010/0007713 | A1 | 1/2010 | Yamamoto et al. |
| 2010/0122217 | A1* | 5/2010 | Yen ................... G06F 17/30058 715/846 |
| 2010/0229221 | A1* | 9/2010 | Tam ........................ G06F 21/10 726/4 |
| 2010/0333131 | A1* | 12/2010 | Parker .................. H04N 7/1675 725/31 |
| 2011/0035503 | A1 | 2/2011 | Zaid et al. |
| 2011/0276535 | A1 | 11/2011 | Pin et al. |
| 2011/0314085 | A1 | 12/2011 | Koronthaly et al. |
| 2012/0158973 | A1* | 6/2012 | Jacobson .......... H04L 29/12613 709/227 |
| 2012/0166436 | A1* | 6/2012 | Kalasapur ......... G06F 17/30749 707/732 |
| 2012/0198075 | A1* | 8/2012 | Crowe ................ H04L 67/2842 709/226 |
| 2012/0290436 | A1 | 11/2012 | Frost et al. |
| 2013/0073609 | A1 | 3/2013 | Connolly et al. |
| 2013/0073622 | A1* | 3/2013 | Nguyen .......... H04N 21/23103 709/204 |
| 2013/0080895 | A1* | 3/2013 | Rossman ............ G06F 3/04883 715/720 |
| 2013/0097236 | A1 | 4/2013 | Khorashadi et al. |
| 2013/0138763 | A1 | 5/2013 | Panzer et al. |
| 2013/0219006 | A1 | 8/2013 | Kuo et al. |
| 2014/0040412 | A1 | 2/2014 | Yanagihara et al. |
| 2014/0064095 | A1 | 3/2014 | Li et al. |
| 2014/0075307 | A1* | 3/2014 | Bargas ................... G06F 17/30 715/716 |
| 2014/0143647 | A1 | 5/2014 | Reshadi et al. |
| 2014/0173230 | A1 | 6/2014 | Smith et al. |
| 2014/0181040 | A1 | 6/2014 | Montulli et al. |
| 2014/0280515 | A1 | 9/2014 | Wei et al. |
| 2014/0344437 | A1 | 11/2014 | Huang |
| 2015/0004949 | A1 | 1/2015 | Fienberg et al. |
| 2015/0169701 | A1* | 6/2015 | Stekkelpak ....... G06F 17/30964 707/723 |
| 2015/0201033 | A1 | 7/2015 | Gupta |
| 2016/0028830 | A1 | 1/2016 | Coglitore et al. |
| 2016/0191673 | A1 | 6/2016 | Bohannon et al. |

OTHER PUBLICATIONS

U.S. Appl. No. 14/339,002 by Coglitore et al., filed Jul. 23, 2014.
International Search Report and Written Opinion for International Application No. PCT/US2014/072633 dated Sep. 1, 2015; 13 pages.
Extended European Search Report for Application No. 15189459.9, dated May 6, 2016, 9 pages.
Non-Final Office Action dated Jun. 23, 2016 of U.S. Appl. No. 14/339,002 by Coglitore, G., et al., filed Jul. 23, 2014.
Wathsala, W.V., et al.: "Next Generation Proxy Servers," Advanced Communication Technology, Feb. 17, 2008, pp. 2183-2187.
U.S. Appl. No. 14/584,815 by Bohannon, P. et al., filed Dec. 29, 2014.
U.S. Appl. No. 14/152,166 by Gupta. V., filed Jan. 10, 2014.
Final Office Action dated Jul. 22, 2016, in U.S. Appl. No. 14/152,166 of Gupta, V., et al., filed Jan. 10, 2014.
Advisory Action dated Oct. 5, 2016, in U.S. Appl. No. 14/152,166 of Gupta, V., et al., filed Jan. 10, 2014.
Final Office Action dated Dec. 9, 2016, in U.S. Appl. No. 14/339,002 of Coglitore, G., et al., filed Jul. 23, 2014.
Non-Final Office Action dated May 26, 2017 of U.S. Appl. No. 14/339,002 by Coglitore, G., et al., filed Jul. 23, 2014.
Advisory Action dated Mar. 10, 2017, in U.S. Appl. No. 14/339,002 of Coglitore, G., et al., filed Jul. 23, 2014.
Non-Final Office Action dated May 9, 2017, in U.S. Appl. No. 14/152,166 of Gupta, V., et al., filed Jan. 10, 2014.
Corrected Notice of Allowability dated Dec. 11, 2017 for U.S. Appl. No. 14/152,166 of Gupta, V., et al., filed Jan. 10, 2014.
Final Office Action dated Nov. 14, 2017 of U.S. Appl. No. 14/339,002 by Coglitore, G., et al., filed Jul. 23, 2014.
Notice of Allowance dated Nov. 15, 2017 U.S. Appl. No. 14/152,166 of Gupta, V., et al., filed Jan. 10, 2014.
International Preliminary Report on Patentability for International Application No. PCT/US2014/072633 dated Jul. 13, 2017; 9 pages.
Non-Final Office Action dated Aug. 14, 2017, in U.S. Appl. No. 14/584,815 of Bohannon, P. et al, filed Dec. 29, 2014.

\* cited by examiner

RESIDENTIAL CACHE APPLIANCE UTILIZING A SOCIAL NETWORK

CROSS-REFERENCES TO RELATED APPLICATIONS

This application is related to and incorporates by reference in its entirety commonly assigned U.S. Non-Provisional application Ser. No. 14/339,002, entitled "RURAL AREA NETWORK DEVICE," filed on Jul. 23, 2014.

RELATED FIELD

At least one embodiment of this disclosure relates generally to network caching, and in particular to residential network caching.

BACKGROUND

A large portion of the Internet follows a client server model in which client devices request content from server systems across the Internet via a browser or a client application, e.g., a mobile application or a video console application. Under current content delivery schemes, network traffic bottlenecks at the server end are generally relieved via content delivery networks (CDNs), which cache content files on cache servers distributed across the Internet nearby large concentrations of users. This solution only partially solves the network traffic bottleneck problem. Despite the use of cache servers, a large amount of redundant traffic still flows through the current client/server network architecture. For example, redundant traffic may flow between CDNs and various servers that service multiple client devices.

Network traffic bottlenecks at the client end are generally relieved via end-user device browser caches. An end-user device browser cache, however, only provides benefits to a specific end-user, and hence has little or no network effect in terms of solving the global bandwidth problem. Furthermore, the end-user device browser cache only benefits the end-user on repeated visit to the same content. However, end-users tend to be more interested in content that he or she has not previously observed before (e.g., a new movie, new picture, or new song). Because of this, the net benefit of the browser cache is further reduced.

Figure 1:
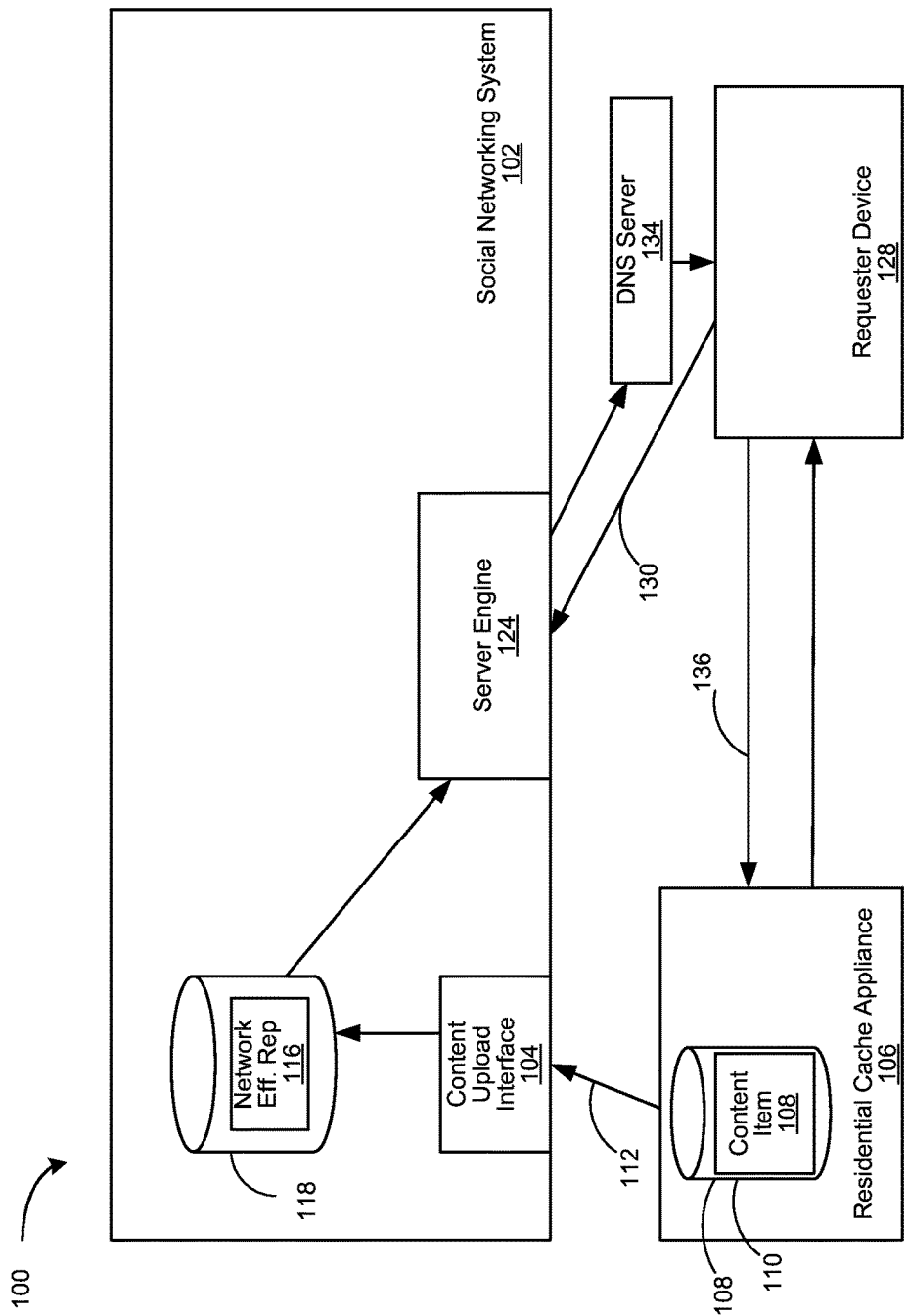
FIG. 1 is a block diagram illustrating a residential caching system to facilitate content sharing through a social networking system, in accordance with various embodiments.

The figures depict various embodiments of this disclosure for purposes of illustration only. One skilled in the art will readily recognize from the following discussion that alternative embodiments of the structures and methods illustrated herein may be employed without departing from the principles of the invention described herein.

DETAILED DESCRIPTION

Disclosed is a residential caching system including a residential caching appliance and a social networking system. The residential caching appliance can be a stand-alone device that services end-user devices (e.g., devices used to present content to the user). In another example, the residential caching appliance can be integrated with network equipment (e.g., router, switch, or gateway) that provides a local network to the end-user devices. In yet another example, the residential caching appliance can be integrated with an end-user device, e.g., a computer, a mobile device, a video console, or a set top box.

The residential caching appliance is associated with a content browsing application, e.g., Internet TV, Internet radio, social network application, or an online video application. The caching appliance can load balance Internet traffic by reducing peak bandwidth usage and sharing content locally. For example, the caching appliance can cache recently requested content, popularly requested content, profile specific content, and content predicted to be "consumed" (i.e., to be presented under a user's direction). The caching appliance can determine what content to download and when to download it, e.g., based on bandwidth consumption, user profile, demographics, and global content streaming patterns. In some embodiments, a user can specify desired content and the caching appliance can download and cache the specified content later, e.g., when network bandwidth utilization is low, fast, cheap, etc. The cached content can optionally be made available to other users, e.g., so that trunk bandwidth usage is reduced.

The disclosed system can resolve some problems experienced by use of conventional client-end browser caches. For example, unlike the browser cache, the caching appliance can enable neighbor devices within the same local network or in a nearby local network to access its cached content. The permission and privacy setting of the caching appliance can be managed by the social networking system. Also, unlike the browser cache, the social networking system can execute predictive caching processes by profiling user accounts (e.g., social networking accounts in the social networking system) through tracking their content-related activities as observed from the social networking system and the caching appliance.

In some embodiments, the caching appliance can store a higher resolution version of user-uploaded content than an online version, e.g., stored at the social networking system. The user, who shared the content, can specify which other users can view the higher resolution version shared locally or globally at the caching appliance. When a viewing user requests the content from the social networking system, the caching appliance can perform a DNS re-route such that the caching appliance can serve the requested content at a higher resolution than is available from the social networking system. The caching appliance can also share (e.g., stream or upload) its cached content with other authorized caching appliances and/or content browsing applications.

Social Networking System Overview

Various embodiments of the disclosed residential caching system utilize a social networking system. Social networking systems commonly provide mechanisms enabling users to interact with objects and other users both within and external to the context of the social networking system. A social networking system user may be an individual or any other entity, e.g., a business or other non-person entity. The social networking system may utilize a web-based interface or a mobile interface comprising a series of inter-connected pages displaying and enabling users to interact with social networking system objects and information. For example, a social networking system may display a page for each social networking system user comprising objects and information entered by or related to the social networking system user (e.g., the user's "profile"). Social networking systems may also have pages containing pictures or videos, dedicated to concepts, dedicated to users with similar interests ("groups"), or containing communications or social networking system activity to, from, or by other users. Social networking system pages may contain links to other social networking system pages, and may include additional capabilities, e.g., search, real-time communication, content-item uploading, purchasing, or advertising. It should be noted that a social networking system interface may be accessible from a web browser and/or a non-web browser application, e.g., a dedicated social networking system application executing on a mobile computing device or other computing device. Accordingly, "page" as used herein may be a web page, an application interface or display, a widget displayed over a web page or application, a box or other graphical interface, an overlay window on another page (whether within or outside the context of a social networking system), or a web page external to the social networking system with a social networking system plug in or integration capabilities.

As discussed above, a social graph can include a set of nodes (representing social networking system objects, also known as social objects) interconnected by edges (representing interactions, activity, or relatedness). A social networking system object may be a social networking system user, nonperson entity, content item, group, social networking system page, location, application, subject, concept, or other social networking system object, e.g., a movie, a band, or a book. Content items can include anything that a social networking system user or other object may create, upload, edit, or interact with, e.g., messages, queued messages (e.g., email), text and SMS (short message service) messages, comment messages, messages sent using any other suitable messaging technique, an HTTP link, HTML files, images, videos, audio clips, documents, document edits, calendar entries or events, and other computer-related files. Subjects and concepts, in the context of a social graph, comprise nodes that represent any person, place, thing, or idea.

A social networking system may enable a user to enter and display information related to the user's interests, education and work experience, contact information, demographic information, and other biographical information in the user's profile page. Each school, employer, interest (for example, music, books, movies, television shows, games, political views, philosophy, religion, groups, or fan pages), geographical location, network, or any other information contained in a profile page may be represented by a node in the social graph. A social networking system may enable a user to upload or create pictures, videos, documents, songs, or other content items, and may enable a user to create and schedule events. Nodes in the social graph may represent content items and events.

A social networking system may provide various means to interact with nonperson objects within the social networking system. For example, a user may form or join groups, or become a fan of a fan page within the social networking system. In addition, a user may create, download, view, upload, link to, tag, edit, or play a social networking system object. A user may interact with social networking system objects outside of the context of the social networking system. For example, an article on a news web site might have a "like" button that users can click. In each of these instances, the interaction between the user and the object may be represented by an edge in the social graph connecting the node of the user to the node of the object. A user may use location detection functionality (such as a GPS receiver on a mobile device) to "check in" to a particular location, and an edge may connect the user's node with the location's node in the social graph.

A social networking system may provide a variety of communication channels to users. For example, a social networking system may enable a user to email, instant message, or text/SMS message, one or more other users; may enable a user to post a message to the user's wall or profile or another user's wall or profile; may enable a user to post a message to a group or a fan page; or may enable a user to comment on an image, wall post or other content item created or uploaded by the user or another user. In least one embodiment, a user posts a status message to the user's profile indicating a current event, state of mind, thought, feeling, activity, or any other present-time relevant communication. A social networking system may enable users to communicate both within and external to the social networking system. For example, a first user may send a second user a message within the social networking system, an email through the social networking system, an email external to but originating from the social networking system, an instant message within the social networking system, and an instant message external to but originating from the social networking system. Further, a first user may comment on the profile page of a second user, or may comment on objects associated with a second user, e.g., content items uploaded by the second user.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection is a social network edge. Being friends in a social networking system may allow users access to more information about each other than would otherwise be available to unconnected users. For example, being friends may allow a user to view another user's profile, to see another user's friends, or to view pictures of another user. Likewise, becoming friends within a social networking system may allow a user greater access to communicate with another user, e.g., by email (internal and external to the social networking system), instant message, text message, phone, or any other communicative interface. Being friends may allow a user access to view, comment on, download, endorse, or otherwise interact with another user's uploaded content items. Establishing connections, accessing user information, communicating, and interacting within the context of the social networking system may be represented by an edge between the nodes representing two social networking system users.

In addition to explicitly establishing a connection in the social networking system, users with common characteristics may be considered connected (such as a soft or implicit connection) for the purposes of determining social context for use in determining the topic of communications. In at least one embodiment, users who belong to a common network are considered connected. For example, users who attend a common school, work for a common company, or belong to a common social networking system group may be considered connected. In at least one embodiment, users with common biographical characteristics are considered connected. For example, the social networking system can use the geographic region, which users were born in or live in, the age of users, the gender of users, and the relationship status of users to determine whether users are connected. In at least one embodiment, users with common interests are considered connected. For example, users' movie preferences, music preferences, political views, religious views, or any other interest may be used to determine whether users are connected. In at least one embodiment, users who have taken a common action within the social networking system are considered connected. For example, users who endorse or recommend a common object, who comment on a common content item, or who RSVP to a common event may be considered connected. A social networking system may utilize a social graph to determine users who are connected with or are similar to a particular user in order to determine or evaluate the social context between the users. The social networking system can utilize such social context and common attributes to facilitate content distribution systems and content caching systems to predictably select content items for caching in cache appliances associated with specific social network accounts.

FIG. 1 is a block diagram illustrating a residential caching system 100 to facilitate content sharing through a social networking system 102, in accordance with various embodiments. The social networking system 102 includes a content upload interface 104 (e.g., implemented on a social networking website or a social networking application). For example, the content upload interface 104 enables a residential cache appliance 106 (e.g., a first user device associated with a social networking account of the social networking system 102) to upload media content to the social networking system 102. The residential cache appliance 106 can be a stand-alone caching-specific device or a general-purpose device configured with residential caching functionalities (e.g., a mobile smart phone or a computer). For example, the residential cache appliance 106 can be a stand-alone application specific device (e.g., a device implemented via application specific integrated circuit (ASIC), field programmable gate array (FPGA), or other circuitry). For another example, the residential cache appliance 106 can be a general-purpose device with an operating system to run third-party applications. The general-purpose device can be configured with an application (e.g., a social networking application) that enables the general-purpose device to function as a caching appliance and implements the disclosed caching mechanisms on the general-purpose device.

The residential cache appliance 106 is a device configured to store one or more copies of content items 108 (a single one of the content items 108 can be referred to as a "content item 108") to be later shared to its peers (e.g., devices on the same local network, devices associated with social connections of the first social network account). The social networking system 102 may be configured to facilitate the sharing of the content items 108. In some embodiments, the residential cache appliance 106 can subsequently present the content items 108 with its own output components (e.g., a display or a speaker) or through its own output channels (e.g., video or audio ports). The residential cache appliance 106 can provide a computer-implemented service where an external device can request a content item copy (e.g., of the content items 108) from the social networking system 102, and the social networking system 102 can redirect that request to the residential cache appliance 106 for the residential cache appliance 106 to serve the content item directly to the external device.

Part of the benefit of the social networking system 102 is enabling users to share personal content with each other to establish shared experiences with the help of the residential cache appliance 106. Session-based redirections from the social networking system 102 enable a user to directly download a content item stored on the residential cache appliance 106 in a residential local network of another user. The content upload interface 104 enables users of the social networking system 102 to generate content while enabling creators of the content to manage the permission settings of how that content propagates through the Internet in the controlled environment of the social networking system 102. For example, the media content can include images, videos, audio clips, text, scripts, or any combination thereof. The content media can be stored in a content cache 110 of the user device.

The residential caching system 100 can implement a bifurcated content storage mechanism to store any given content item. For example, the residential cache appliance 106 stores a full copy of a content item 108 in the content cache 110. Normally, when a user shares a content item on the social networking system 102, the user uploads a full copy onto the social networking system. Here, when the residential cache appliance 106 interacts with the content upload interface 104, the residential cache appliance 106 can transmit an upload package 112 of the content item 108 to the social networking system 102. The upload package 112 can either be a full copy of the content item 108 or a network efficient representation 116 of the content item 108. In some embodiments, the social networking system 102 can request the residential cache appliance 106 to generate the network efficient representation 116 based on the content item 108.

The social networking system 102 can store the network efficient representation 116 in a content storage 118. In some embodiments, the content storage 118 can also store the full copy of the content item 108 (e.g., through the upload package 112 or a subsequent upload package). Whether to store the full copy can depend on whether, at the time of uploading, network bandwidth (from either endpoints) that is required to upload the full copy through the content upload interface 104 is sufficient. Whether to store the full copy can also depend on whether, at the time of uploading, there is sufficient available storage capacity in the content storage 118.

For example, when the social networking system 102 determines that the size of the full copy is too large for a content storage 118 (i.e., a storage space managed by the social networking system 102) or network bandwidth to transport (e.g., according to respective thresholds), the social networking system 102 can request the network efficient representation 116 be generated at the residential cache appliance 106 and delivered to the social networking system 102. The user of the residential cache appliance 106 can choose to upload only the network efficient representation 116 for personal reasons, or privacy-related and security reasons. The user of the residential cache appliance 106 can also choose to upload both the network efficient representation 116 and the full copy of the content item 116.

That is, the determination of sufficiency may depend on the size of the content item 108 relative to a threshold. The threshold can be constant, adjusted periodically, or adjusted in real-time based on the available storage capacity of the content storage 118 and the network bandwidth of the network channel connecting the social networking system 102 to the user devices. The content storage 118 can be one or more storage devices the stores and serves data on behalf of the social networking system 102.

In some embodiments, the network efficient representation 116 is a lower resolution instance of the content item 108 (e.g., where the content item is an image or a video). In some embodiments, the network efficient representation 116 is a lower frame rate or a lower sample rate instance of the content item 108. In some embodiments, the network efficient representation 116 is truncated (e.g., where the content item is a video or an audio clip) or summarized (e.g., a trailer). In some embodiments, the network efficient representation 116 is compressed or encrypted. This can increase the difficulty of a foreign entity deriving the network efficient representation 116 from the content item 108. In some embodiments, the network efficient representation 116 is an iconic or symbolic representation (e.g., a textual description or an icon of the file type) of the content item 108 with no real similarity to the actual content item 108 and is not a derivative content of the content item 108.

The social networking system 102 also includes a server engine 124. The server engine 124 is configured to provide content to external devices through a social network interface. For example, the server engine 124 can implement a web service to provide a social networking website to a user device (e.g., via a web browser application of the user device) to access content items associated with social networking accounts. The server engine 124 may also include an application interface to provide the social networking interface for a user device (e.g., via a mobile application of the user device) to access the content items.

The server engine 124 can provide user devices with content items (e.g., full copies or network efficient representations) in the content storage 118 via the social networking interface. The social networking interface enables a user to browse content items associated with social networking accounts (e.g., the first social networking or other users of the social networking system 102). For example, the server engine 124 can receive a content request from a requester device 128 (e.g., a second user device associated with a second social networking account of the social networking system 102) for the content item 108. For example, the requester device 128 can also be a residential cache appliance similar to the residential cache appliance 106. The requester device 128 can be a mobile device (e.g., a smart phone or a tablet), a stationary device (e.g., a desktop computer or a server computer), or a virtual device.

The social networking interface can present the network efficient representation 116 to the requesting user if the network efficient representation 116 is available in the content storage 118. Otherwise, the social networking interface can present the full copy of the content item 108 if that is available in the content storage 118. If the full copy is unavailable and if the content request indicates that the network efficient representation 116 is insufficient, then the server engine 124 provides an option for the requester device 128 to download or stream the content item 108 directly from the residential cache appliance 106. Also if the server engine 124 is unable to deliver the full copy (e.g., due to network constraints), the server engine 124 can provide the option to the requester device 128. In some embodiments, instead of providing the option, the server engine 124 redirects content requests directly to the residential cache appliance 106.

In one example, the server engine 124 can first determine its ability to deliver by determining whether a full copy of the requested content item is accessible in real-time. The server engine 124 can then determine whether it is able to deliver by determining the context of the content request 130 (e.g., whether multiple content items are requested to be presented or displayed simultaneously, the display or presentation capabilities of the requester device 128, format of a webpage that the requested content item is part of, default settings of the webpage, etc.). Yet further, the server engine 124 can determine the ability to deliver by determining the network bandwidth of the server engine 124. The server engine 124 can determine the sufficiency of the network efficient representation 116 by determining whether the user of the requester device 128 specifically requested (e.g., via a user interaction or a browser/application setting) for the full copy (e.g., a high resolution instead of a low resolution copy).

The server engine 124 can be configured to determine whether the content storage 118 has a full copy (i.e., exact copy of what was intended to be uploaded) of the content item 108, and if so, to provide an option to send or stream the full copy to the requester device 128. The server engine 124 can also be configured to determine whether the content storage 118 has a network efficient representation 116 of the content item 108, and if so, to provide the network efficient representation 116 to the requester device 128 and an option for the requester device 128 to request the full copy of the content item 108 directly from the residential cache appliance 106.

In some embodiments, even when the server engine 124 has a full copy of the content item 108, the server engine 124 provides an option for the requester device 128 to request the full copy of the content item 108 directly from the residential cache appliance 106. This is advantageous when the content item 108 is large, and the server engine 124 determines that its network bandwidth is too low to support streaming of the large file to the requester device 128. In some embodiments, the server engine 124 may keep track of multiple user devices that respectively have a full copy of the content item 108. In those embodiments, the server engine 124 can provide the option to the requester device 128 to request the full copy from any one or more of the multiple user devices.

In one example, in response to the content request, the server engine 124 can provide a webpage to the requester device 128. The webpage can include an interface for the social networking system 102. The webpage can include the network efficient representation 116 or a link to the network efficient representation 116 associated with a first user profile, where the first user profile is associated with the residential cache appliance 106. The webpage can further include an interactive component that provides the option for the requester device 128 to directly request the full copy of the content item 108 from the residential cache appliance 106.

In some embodiments, instead of providing the option to directly request the full copy of the content item 108, the server engine 124 creates a session-based redirection (e.g., a domain name system (DNS) translation) of the content request such that the content request is automatically re-routed to the residential cache appliance 106, which stores the requested content item. The DNS translation, for example, can be sent to a DNS server 134 serving the requester device 128. This automatic redirection occurs when a full copy is not present in the content storage 118 or the social networking system 102 is otherwise unable to deliver the full copy.

When a user (e.g., a second user profile associated with the requester device 128) activates the interactive component to take the option or is redirected, the requester device 128 sends a peer-to-peer request 136 to the residential cache appliance 106 to access the content cache 110 to retrieve the content item 108. The residential cache appliance 106, in response to the peer-to-peer request 136, can send or stream the content item 108 back to the requester device 128.

Figure 2:
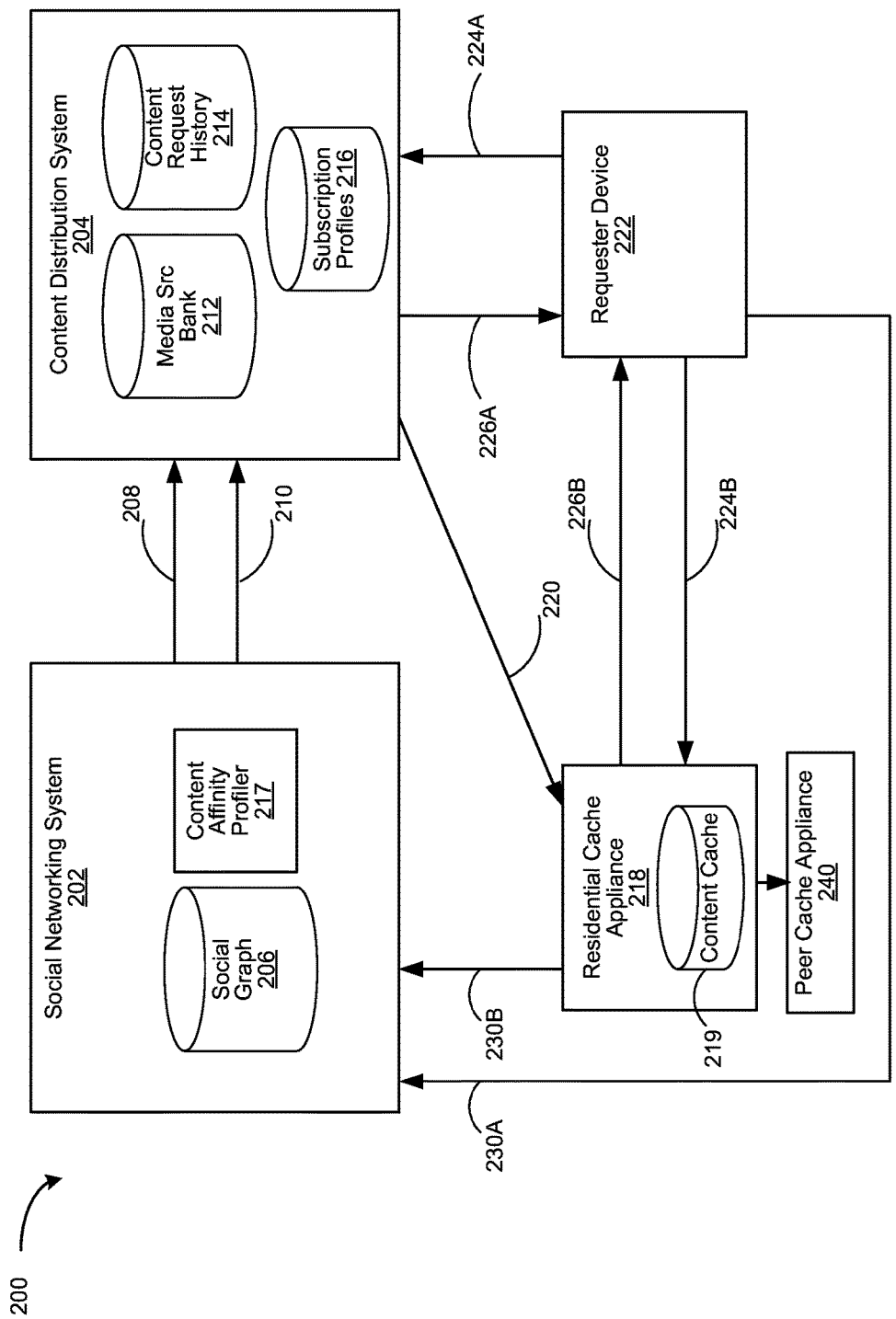
FIG. 2 is a block diagram illustrating a residential caching system to improve network performance of content streaming via predictive caching utilizing a social networking system, in accordance with various embodiments.

FIG. 2 is a block diagram illustrating a residential caching system 200 to improve network performance of content streaming via predictive caching utilizing a social networking system 202, in accordance with various embodiments. In some embodiments, the residential caching system 200 is the residential caching system 100 of FIG. 1. In some embodiments, the social networking system 202 is the social networking system 102 of FIG. 1. A content streaming service may be provided by a content distribution system 204 (e.g., a video streaming service or an audio streaming service). In some embodiments, a vendor different from the social networking system 202 operates the content distribution system 204.

Figure 3:
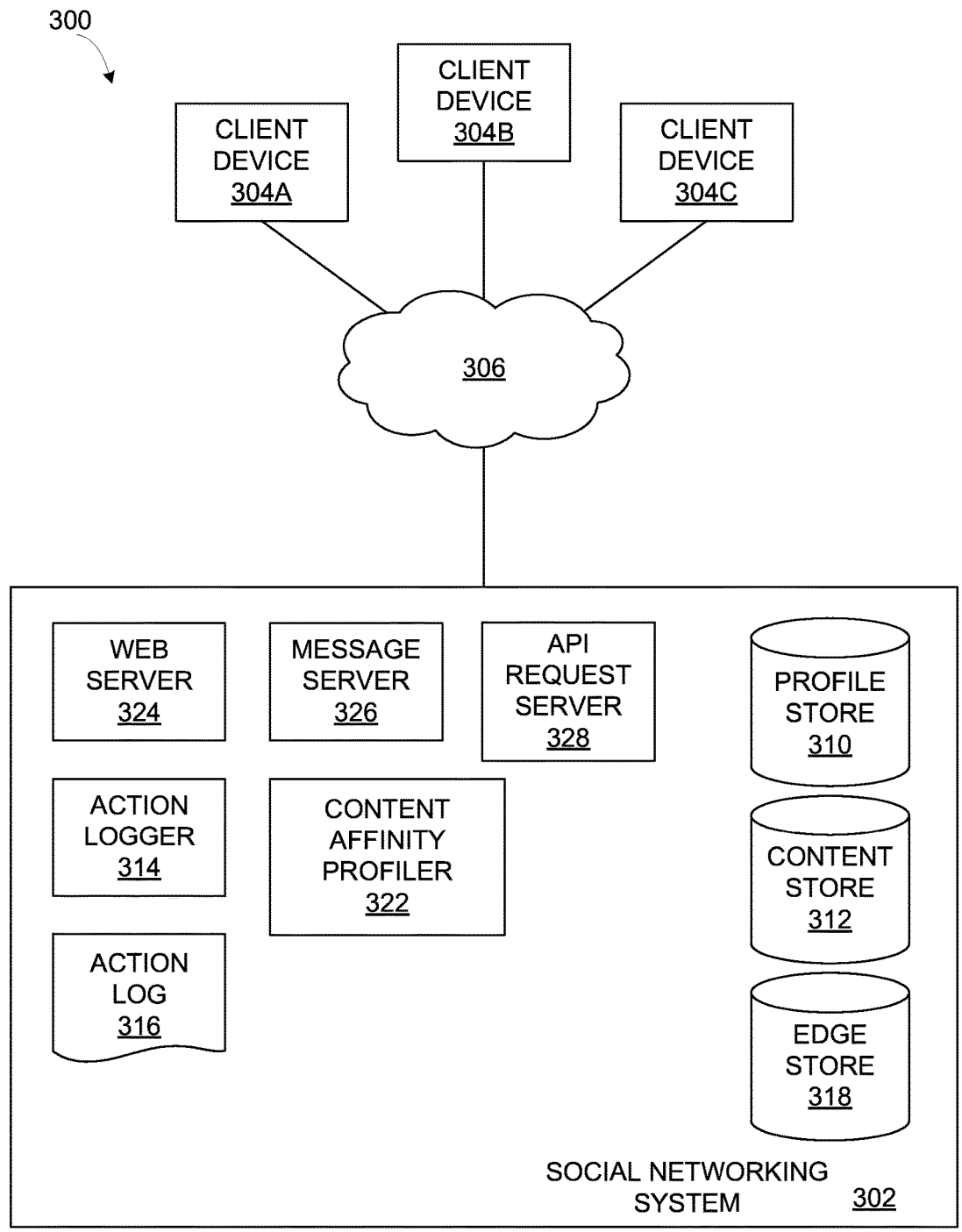
FIG. 3 is a high level block diagram of a system environment suitable for a social networking system, in accordance with various embodiments.

The social networking system 202 can store a social graph 206 (e.g., as implemented by the profile store 310, the edge store 318, the content store 312, and the action log 316 of FIG. 3) that provides information regarding profiles of social networking accounts (e.g., the users of the social networking system 202) and activities related to the social networking accounts. For example, the social graph 206 can store or reference network addresses of computing devices associated with the social networking accounts. For another example, the social graph 206 can store or reference activities (e.g., content-related activities) performed by users of the social networking accounts (e.g., content viewing, commenting, or sharing activities).

The social networking system 202 can share some of the information in the social graph 206 with the content distribution system 204. For example, the social networking system 202 can share an interaction history 208 associated with a social networking account or a content item (e.g., a video or an audio). For another example, the social networking system 202 can share a cache map 210 that identifies network addresses of residential cache appliances (e.g., user devices configured to cache content items for the content distribution system 204) associated with various social networking accounts.

The content distribution system 204 includes a media source bank 212. The media source bank 212 stores multimedia content that can be streamed to user devices across a network (e.g., a global network, a local network, or a combination thereof). For example, where the content distribution system 204 provides a video streaming service, the media source bank 212 stores multiple video files that can be streamed over the network. The content distribution system 204 can record a content request history 214 that stores data relating to content requests over a period of time. The content request history 214 can be organized by time, by region, by subscription profiles 216 associated with accounts that subscribe to content in the content distribution system 204, or any combination thereof. The subscription profiles 216 can be associated with the social networking accounts in the social graph 206.

The social networking system 202 can include a content affinity profiler 217 that determines content items that users of the social networking system 202 and/or the content distribution system 204 may be interested in. The content affinity profiler 217 can utilize the interaction history 208, the cache map 210, the content request history 214, settings and preferences of the subscription profiles 216, or other data available on the social networking system 202 and/or the content distribution system 204 to compute affinity scores between a content item and a user profile. For example, activities that increase the affinity scores include a content request, approval, comment, or other activity involving the content item or a related content item by the user profile or a neighbor user profile. A content item is "related" to another based on one or more shared attributes (e.g., size, length, or publish date), tags (e.g., a category tag or a title tag), metadata (e.g., last access time or last user to access the content item), or other characteristics. A user profile is a "neighbor" of another in a variety of ways, including being a geographical neighbor (e.g., close known locations of the users), a social neighbor (users being directly or closely yet indirectly connected in the social graph 206), or a network neighbor (users being in the same local network or regional network).

The content distribution system 204 can select certain residential cache appliances to store a portion of the media content in the media source bank 212. This selection may be assisted by the content affinity profiler 217 (e.g., determined based on the affinity score between a user profile and a content item). The content distribution system 204 can determine where to cache (e.g., a network address of a residential cache appliance) based on the interaction history 208, the cache map 210, the content request history 214, settings and preferences of the subscription profiles 216, or any combination thereof. Examples of predictive caching include selecting a top popularly requested content item (e.g., by region, profile type of user, recency, or content type) by the owner of the target residential cache appliance or by a "neighbor user" of the owner; selecting a recently requested content item (e.g., by the owner or the neighbor user; selecting a content item based on an inferred content category preference of the owner; selecting a content item based on an expressed preference of the owner; and selecting a content based on a top popular content category based on implied and/or expressed preferences of neighboring users. The preferences of the owner can be derived from the owner's social networking account and/or subscription profile. A "neighbor user" may refer to a network neighbor who resides on a common local network as the target residential cache appliance. A "neighbor user" may also refer to a social network neighbor who resides on a common social network (e.g., a social connection of the owner) as the social networking account of the owner.

Once the content distribution system 204 selects a residential cache appliance 218 (e.g., a first user device associated with a first social networking account of the social networking system 202), the content distribution system 204 can "push" a content item via a content push request 220. Pushing involves a data transfer communication where a data transmission request is initiated by a server (e.g., the content distribution system 204) to a destination client (e.g., the residential cache appliance 218). In some embodiments, the residential cache appliance 218 is the residential cache appliance 106 of FIG. 1. In some embodiments, the content push request 220 can coincide with streaming the content item to the residential cache appliance 218. For example, if the residential cache appliance 218 is selected to cache the content item (e.g., for the neighbor users of the owner), the caching can occur while the content item is already being streamed to a local network of the residential cache appliance 218 (e.g., either the owner or someone in the owner's family is streaming the content). The residential cache appliance 218 can then cache the content item a content cache 219 (e.g., the content cache 110 of FIG. 1).

A requester device 222, when interacting with the content distribution system 204, can subsequently request (e.g., via a content request 224A) the content item that has been cached in the residential cache appliance 218. Upon detecting that this has occurred, the content distribution system 204 can either provide an option to redirect the content request 224A or automatically redirect the content request 224A to the residential cache appliance 218. The redirection can happen, for example, through a DNS server (not shown) as described above. Alternatively, the content distribution system 204 can still provide a content stream 226A to stream the requested content item to the requester device 222, in response to the content request 224A.

When the requester accepts the option for redirection or when the automatic redirection occurs, a redirected content request 224B is sent to the residential cache appliance 218. In response, the residential cache appliance 218 provides a content stream 226B to the requester device 222.

In some embodiments, the requester device 222 reports content interaction activities 230A associated with content items presented therefrom to either the social networking system 202 or the content distribution system 204. Likewise, in some embodiments, the residential cache appliance 218 reports content interaction activities 230B associated with the content items streamed therefrom to either the social networking system 202 or the content distribution system 204. The content interaction activities 230A and 230B can be organize into the interaction history 208 for later determining the preferences of the social networking accounts or the subscription profiles 216. The content interaction activities 230A and 230B, for example, can include what content items are requested, what are the expressed preferences towards the content items, comments regarding content items, language selections and other configurations made when viewing the content items, who requested what content items, content items that have been requested or played in sequence from one another, or any combination thereof.

In some embodiments, the residential cache appliance 218 can push one or more cached content items to a peer cache appliance 240. Such pushes can be initiated by the social networking system 202, the content distribution system 204, the residential cache appliance 218, the peer cache appliance 240, or a combination thereof. For example, the social networking system 202 or the content distribution system 204 can select the peer cache appliance 240 to cache the content items based on the inferred preference of accounts (e.g., subscription profiles or social networking accounts) within the social network of the owner of the peer cache appliance 240 or within a local network of the peer cache appliance 240. For another example, the peer cache appliance 240 can indicate that it would like to cache the content items. Then, the social networking system 202 or the content distribution system 204 can select the residential cache appliance 218 based on the network bandwidth and speed between the residential cache appliance 218 and the peer cache appliance 240. The social networking system 202 or the content distribution system 204 can also select the residential cache appliance 218 based on whether the owner of the peer cache appliance 240 is a social connection to the owner of the residential cache appliance 218 in the social networking system 202. In some embodiments, the residential cache appliance 218 can initiate content item pushes to the peer cache appliance 240.

In some embodiments, the social networking system 202 or the content distribution system 204 can keep track of what content items are cached in which cache appliances in the cache map 210. In some embodiments, the content distribution system 204 can credit one of the subscription profiles 216 whenever a cache appliance (e.g., the residential cache appliance 218 or the peer cache appliance 240) stores and/or serve content item on behalf of the content distribution system 204 (i.e., a content request for the content item can be redirected to the cache appliance).

In some embodiments, some of the functionalities, processes, and methods described for the social networking system 202 can be executed by the content distribution system 204. Likewise, some of the functionalities, processes, and methods described for the content distribution system 204 can be executed by the social networking system 202.

FIG. 3 is a high level block diagram of a system environment 300 suitable for a social networking system 302, in accordance with various embodiments. The system environment 300 shown in FIG. 3 includes the social networking system 302 (e.g., the social networking system 102 of FIG. 1 or the social networking system 202 of FIG. 2), a client device 304A, and a network channel 306. The system environment 300 can include other client devices as well, e.g., a client device 304B and a client device 304C. The client devices 304A, 304B, and 304C, for example, can include the residential cache appliance 106, the residential cache appliance 218, the requester device 128, the requester device 222, or any combination thereof. In other embodiments, the system environment 300 may include different and/or additional components than those shown by FIG. 3.

Social Networking System Environment and Architecture

The social networking system 302, further described below, comprises one or more computing devices storing user profiles associated with users (i.e., social networking accounts) and/or other objects as well as connections between users and other users and/or objects. Users join the social networking system 302 and then add connections to other users or objects of the social networking system to which they desire to be connected. Users of the social networking system 302 may be individuals or entities, e.g., businesses, organizations, universities, manufacturers, etc. The social networking system 302 enables its users to interact with each other as well as with other objects maintained by the social networking system 302. In some embodiments, the social networking system 302 enables users to interact with third-party websites and a financial account provider.

Based on stored data about users, objects and connections between users and/or objects, the social networking system 302 generates and maintains a "social graph" comprising multiple nodes interconnected by multiple edges. This social graph can be the social graph 206 of FIG. 2. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 302 adds and/or modifies edges connecting the various nodes to reflect the interactions.

The client device 304A is a computing device capable of receiving user input as well as transmitting and/or receiving data via the network channel 306. In at least one embodiment, the client device 304A is a conventional computer system, e.g., a desktop or laptop computer. In another embodiment, the client device 304A may be a device having computer functionality, e.g., a personal digital assistant (PDA), mobile telephone, a tablet, a smart-phone or similar device. In yet another embodiment, the client device 304A can be a virtualized desktop running on a cloud computing service. The client device 304A is configured to communicate with the social networking system 302 via a network channel 306 (e.g., an intranet or the Internet). In at least one embodiment, the client device 304A executes an application enabling a user of the client device 304A to interact with the social networking system 302. For example, the client device 304A executes a browser application to enable interaction between the client device 304A and the social networking system 302 via the network channel 306. In another embodiment, the client device 304A interacts with the social networking system 302 through an application programming interface (API) that runs on the native operating system of the client device 304A, e.g., IOS® or ANDROID™.

The client device 304A is configured to communicate via the network channel 306, which may comprise any combination of local area and/or wide area networks, using both wired and wireless communication systems. In at least one embodiment, the network channel 306 uses standard communications technologies and/or protocols. Thus, the network channel 306 may include links using technologies, e.g., Ethernet, 802.11, worldwide interoperability for microwave access (WiMAX), 3G, 4G, CDMA, digital subscriber line (DSL), etc. Similarly, the networking protocols used on the network channel 306 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network channel 306 may be represented using technologies and/or formats including hypertext markup language (HTML) or extensible markup language (XML). In addition, all or some of links can be encrypted using conventional encryption technologies, e.g., secure sockets layer (SSL), transport layer security (TLS), and Internet Protocol security (IPsec).

The social networking system 302 includes a profile store 310, a content store 312, an action logger 314, an action log 316, an edge store 318, a content affinity profiler 322, a web server 324, a message server 326, and an API request server 328. In other embodiments, the social networking system 302 may include additional, fewer, or different modules for various applications. Conventional components, e.g., network interfaces, security mechanisms, load balancers, failover servers, management and network operations consoles, and the like are not shown so as to not obscure the details of the system architecture.

User of the social networking system 302 can be associated with a user profile, which is stored in the profile store 310. The user profile is associated with a social networking account. A user profile includes declarative information about the user that was explicitly shared by the user, and may include profile information inferred by the social networking system 302. In some embodiments, a user profile includes multiple data fields, each data field describing one or more attributes of the corresponding user of the social networking system 302. The user profile information stored in the profile store 310 describes the users of the social networking system 302, including biographic, demographic, and other types of descriptive information, e.g., work experience, educational history, gender, hobbies or preferences, location and the like. A user profile may also store other information provided by the user, for example, images or videos. In some embodiments, images of users may be tagged with identification information of users of the social networking system 302 displayed in an image. A user profile in the profile store 310 may also maintain references to actions by the corresponding user performed on content items (e.g., items in the content store 312) and stored in the edge store 318 or the action log 316.

A user profile may be associated with one or more financial accounts, enabling the user profile to include data retrieved from or derived from a financial account. In some embodiments, information from the financial account is stored in the profile store 310. In other embodiments, it may be stored in an external store.

A user may specify one or more privacy settings, which are stored in the user profile, that limit information shared through the social networking system 302. For example, a privacy setting limits access to cache appliances associated with users of the social networking system 302.

The content store 312 (e.g., the content storage 118 of FIG. 1) stores content items (e.g., images, videos, or audio files) associated with a user profile. The content store 212 can also store references to content items that are stored in an external storage or external system. Content items from the content store 312 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social networking system by displaying content related to users, objects, activities, or functionalities of the social networking system 302. Examples of social networking content items include suggested connections or suggestions to perform other actions, media provided to, or maintained by, the social networking system 302 (e.g., pictures or videos), status messages or links posted by users to the social networking system, events, groups, pages (e.g., representing an organization or commercial entity), and any other content provided by, or accessible via, the social networking system.

The content store 312 also includes one or more pages associated with entities having user profiles in the profile store 310. An entity can be a non-individual user of the social networking system 302, e.g., a business, a vendor, an organization, or a university. A page includes content associated with an entity and instructions for presenting the content to a social networking system user. For example, a page identifies content associated with the entity's user profile as well as information describing how to present the content to users viewing the brand page. Vendors may be associated with pages in the content store 312, enabling social networking system users to more easily interact with the vendor via the social networking system 302. A vendor identifier is associated with a vendor's page, thereby enabling the social networking system 302 to identify the vendor and/or to retrieve additional information about the vendor from the profile store 310, the action log 316 or from any other suitable source using the vendor identifier. In some embodiments, the content store 312 may also store one or more targeting criteria associated with stored objects and identifying one or more characteristics of a user to which the object is eligible to be presented.

The action logger 314 receives communications about user actions on and/or off the social networking system 302, populating the action log 316 with information about user actions. Such actions may include, for example, adding a connection to another user, sending a message to another user, uploading an image, reading a message from another user, viewing content associated with another user, attending an event posted by another user, among others. In some embodiments, the action logger 314 receives, subject to one or more privacy settings, content interaction activities (e.g., the content interaction activities 230A or the content interaction activities 230B of FIG. 2) associated with a user. In addition, a number of actions described in connection with other objects are directed at particular users, so these actions are associated with those users as well. These actions are stored in the action log 316.

In accordance with various embodiments, the action logger 314 is capable of receiving communications from the web server 324 about user actions on and/or off the social networking system 302. The action logger 314 populates the action log 316 with information about user actions to track them. This information may be subject to privacy settings associated with the user. Any action that a particular user takes with respect to another user is associated with each user's profile, through information maintained in a database or other data repository, e.g., the action log 316. Such actions may include, for example, adding a connection to the other user, sending a message to the other user, reading a message from the other user, viewing content associated with the other user, attending an event posted by another user, being tagged in photos with another user, liking an entity, etc.

The action log 316 may be used by the social networking system 302 to track user actions on the social networking system 302, as well as external website that communicate information to the social networking system 302. Users may interact with various objects on the social networking system 302, including commenting on posts, sharing links, and checking-in to physical locations via a mobile device, accessing content items in a sequence or other interactions. Information describing these actions is stored in the action log 316. Additional examples of interactions with objects on the social networking system 302 included in the action log 316 include commenting on a photo album, communications between users, becoming a fan of a musician, adding an event to a calendar, joining a groups, becoming a fan of a brand page, creating an event, authorizing an application, using an application and engaging in a transaction. Additionally, the action log 316 records a user's interactions with advertisements on the social networking system 302 as well as applications operating on the social networking system 302. In some embodiments, data from the action log 316 is used to infer interests or preferences of the user, augmenting the interests included in the user profile and enabling a more complete understanding of user preferences.

Further, user actions that happened in particular context, e.g., when the user was shown or was seen accessing particular content on the social networking system 302, can be captured along with the particular context and logged. For example, a particular user could be shown/not-shown information regarding candidate users every time the particular user accessed the social networking system 302 for a fixed period of time. Any actions taken by the user during this period of time are logged along with the context information (i.e., candidate users were provided/not provided to the particular user) and are recorded in the action log 316. In addition, a number of actions described below in connection with other objects are directed at particular users, so these actions are associated with those users as well.

The action log 316 may also store user actions taken on external websites services (e.g., one of the subscription profiles 216 of FIG. 2) associated with the user. For example, the content distribution system 204 of FIG. 2 may recognize a user of the social networking system 302 through social plug-ins that enable the content distribution system 204 to identify the user of the social networking system 302. Because users of the social networking system 302 are uniquely identifiable, the content distribution system 204 may use the information about these users to facilitate their interactions with the content distribution service. The action log 316 records data about these users, including viewing histories, advertisements that were engaged, purchases or rentals made, and other patterns from content requests and/or content interactions. Actions identified by the action logger 314 from the content distribution system 204 associated with the user enable the action log 316 to record further information about additional types of user actions.

In some embodiments, the edge store 318 stores the information describing connections between users and other objects on the social networking system 302 in edge objects. The edge store 318 can store the social graph described above, e.g., the social graph 206 of FIG. 2. Some edges may be defined by users, enabling users to specify their relationships with other users. For example, users may generate edges with other users that parallel the users' real-life relationships, e.g., friends, co-workers, partners, and so forth. Other edges are generated when users interact with objects in the social networking system 302, e.g., expressing interest in a page or a content item on the social networking system, sharing a link with other users of the social networking system, and commenting on posts made by other users of the social networking system. The edge store 318 stores edge objects that include information about the edge, e.g., affinity scores for objects, interests, and other users. Affinity scores may be computed by the social networking system 302 over time to approximate a user's affinity for an object, interest, and other users in the social networking system 302 based on the actions performed by the user. For example, the content affinity profiler 322 (e.g., the content affinity profiler of FIG. 2) can compute affinity scores to approximate a user's affinity to a content item. Multiple interactions of the same type between a user and a specific object may be stored in one edge object in the edge store 318, in at least one embodiment. In some embodiments, connections between users may be stored in the profile store 310. In some embodiments, the profile store 310 may reference or be referenced by the edge store 318 to determine connections between users. Users may select from predefined types of connections, or define their own connection types as needed.

The web server 324 (e.g., the server engine 124 of FIG. 1) links the social networking system 302 via a network to one or more client devices; the web server 324 serves web pages, as well as other web-related content, e.g., Java, Flash, XML, and so forth. The web server 324 may communicate with the message server 326 that provides the functionality of receiving and routing messages between the social networking system 302 and client devices. The messages processed by the message server 326 can be instant messages, email messages, text and SMS (short message service) messages, photos, or any other suitable messaging technique. In some embodiments, a message sent by a user to another user can be viewed by other users of the social networking system 302, for example, by the connections of the user receiving the message. An example of a type of message that can be viewed by other users of the social networking system besides the recipient of the message is a wall post. In some embodiments, a user can send a private message to another user that can only be retrieved by the other user.

The application program interface (API) request server 328 enables external systems (e.g., the content distribution system 204) to access information from the social networking system 302 by calling APIs. The information provided by the social network may include user profile information or the connection information of users as determined by their individual privacy settings. For example, a system interested in predicting the probability of users forming a connection within a social networking system may send an API request to the social networking system 302 via a network. The API request server 328 of the social networking system 302 receives the API request. The API request server 328 processes the request by determining the appropriate response, which is then communicated back to the requesting system via a network.

The content affinity profiler 322 is configured to determine the content affinity of specific users in the profile store 310. The content affinity profiler 322 can access data from the data stores (e.g., the profile store 310, the content store 312, the edge store 318, and the action log 316) in the social networking system 302 to predict what content these users may request in the future. The content affinity profiler 322 can compute affinity scores between a content item and a user profile. For example, the content affinity profiler 322 can compute the affinity scores in the same manner as the content affinity profiler 217 of FIG. 2.

A residential caching system (e.g., the residential caching system 100 of FIG. 1 or the residential caching system 200 of FIG. 2) can implement one or more methods to manage cached content at a residential cache appliance using a social networking system. The methods can be implemented by various data storages and modules described in FIGS. 1-3. The modules can be implemented as hardware components, software components, or any combination thereof. For example, the modules described can be software components implemented as instructions on a non-transitory memory capable of being executed by a processor or a controller on a machine described in FIG. 7. For another example, the methods and other techniques introduced in the modules above can be implemented by programmable circuitry programmed or configured by software and/or firmware, or they can be implemented entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Each of the modules can operate individually and independently of other modules. Some or all of the modules can be combined as one module. A single module can also be divided into sub-modules, each performing a separate method step or method steps of the single module. The modules can share access to a memory space. One module can access data accessed by or transformed by another module. The modules can be considered "coupled" to one another if they share a physical connection or a virtual connection, directly or indirectly, enabling data accessed or modified from one module to be accessed in another module. Each of the data storages can operate individually and independently of other data storages. Some or all of the data storages can be combined as one data storage. A single data storage can also be divided into sub-storages, each containing a portion of the single data storage.

The storages or "stores," described below are hardware components or portions of hardware components for storing digital data. Each of the storage can be a single physical entity or distributed through multiple physical devices. Each of the storage can be on separate physical devices or share the same physical device or devices. Each of the stores can allocate specific storage spaces for run-time applications, processes, or modules.

The systems described can include additional, fewer, or different modules for various applications. Conventional components, e.g., network interfaces, security functions, load balancers, failover servers, management and network operations consoles, and the like are not shown so as to not obscure the details of the system.

Figure 4:
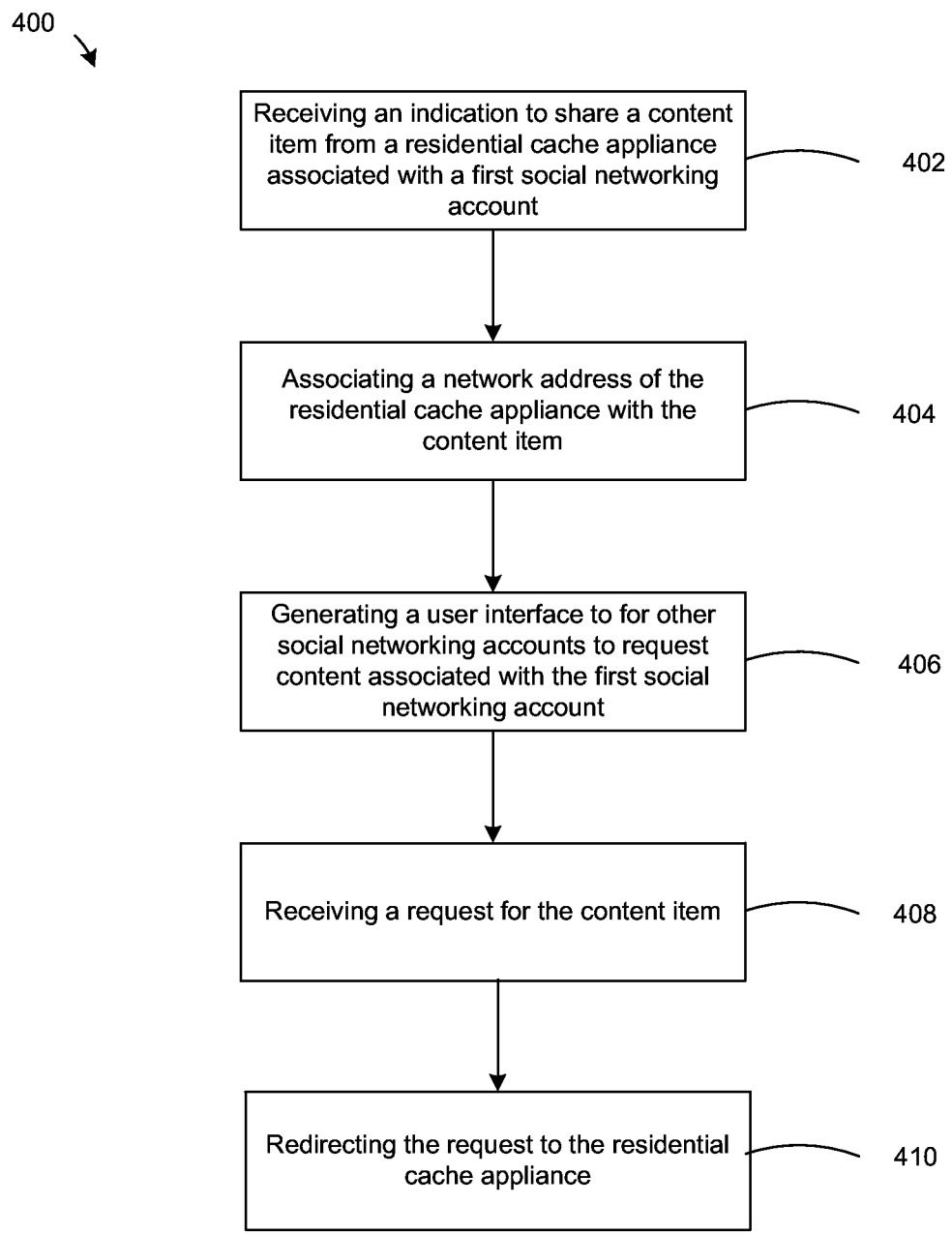
FIG. 4 is a flow chart of a method of operating a residential caching system to facilitate content sharing through a social networking system, in accordance with various embodiments.

FIG. 4 is a flow chart of a method 400 of operating a residential caching system (e.g., the residential caching system 100 of FIG. 1 or the residential caching system 200 of FIG. 2) to facilitate content sharing through a social networking system (e.g., the social networking system 102 of FIG. 1 or the social networking system 202 of FIG. 2), in accordance with various embodiments. At block 402, the social networking system receives an indication to share a content item from a residential cache appliance (e.g., the residential cache appliance 106 of FIG. 1 or the residential cache appliance 218 of FIG. 2) associated with a first social networking account. Step 402 can include receiving a network efficient representation of the content item from the residential cache appliance. In some embodiments, block 402 is in response to determining that the content item is too large for the social networking system to store or serve to external devices. As such, the social networking system can then instruct the residential cache appliance to generate the network efficient representation for the content item to store in the social networking system. In some embodiments, a user can skip block 402. When a user skip block 402, the social networking system can assign a network efficient representation automatically.

The residential cache appliance can be a general-purpose device with an operating system to run third party software, such as a smart phone, a tablet, or a computer. The residential cache appliance can also be an application-specific device, such as a stand-alone cache appliance. The residential cache appliance can be configured by executable instructions to facilitate block 402. For example, the residential cache appliance can be configured by a hardware circuitry, an application (e.g., a social networking application on a mobile phone), a client-side script executable on a web browser, or an embedded webpage widget.

The network efficient representation can be a derivative content item generated based on the content item. For example, the network efficient representation can be a lower resolution version, a lower sampling rate version, or a lower quality version of the content item. The network efficient representation can instead be a symbolic or iconic representation of the content item that is not derived from the content item. For example, the network efficient representation can be a textual description of the content item, an icon representing the file type of the content item, or a combination thereof.

Then at block 404, the social networking system associates a network address to the residential cache appliance with the content item. Block 404 can include associating the network efficient representation with the content. The network address is for identifying the residential cache appliance in a network (e.g., a global network or a local network) to obtain the content item.

At block 406, the social networking system generates a user interface for other social networking accounts to request content associated with the first social networking account. The user interface is configured to provide access to the network efficient representation stored in the social networking server system. The user interface can be configured to provide an option for the social networking accounts to request the content item (i.e., the full copy of the content item). For example, block 402 can include the social networking system receiving a configuration of whether the user interface is to provide the option.

At block 408, the social networking system receives a request for the content item from a requester device (e.g., the requester device 128 of FIG. 1 or the requester device 222 of FIG. 2) associated with a second social networking account through the user interface. In response to the request, at block 410, the social networking system redirects the requester device to the residential cache appliance for the content item. Step 410 may be in response to determining that the content item is too large for network bandwidth of the social networking system to deliver. In some embodiments, block 410 includes verifying that the second social networking account has permission to access the content item according to a permission policy associated with or designated by the first social networking account. The permission policy can indicate specific permission settings for the residential cache appliance or specifically the content item. In some embodiments, block 410 includes sending a network address translation message to a domain name service (DNS) server to redirect the request and/or subsequent requests (e.g., during a network session) for the content item to the residential cache appliance. In some embodiments, redirecting the requester device to the residential cache appliance is in response to determining that the content item is unavailable in the social networking system.

Figure 5:
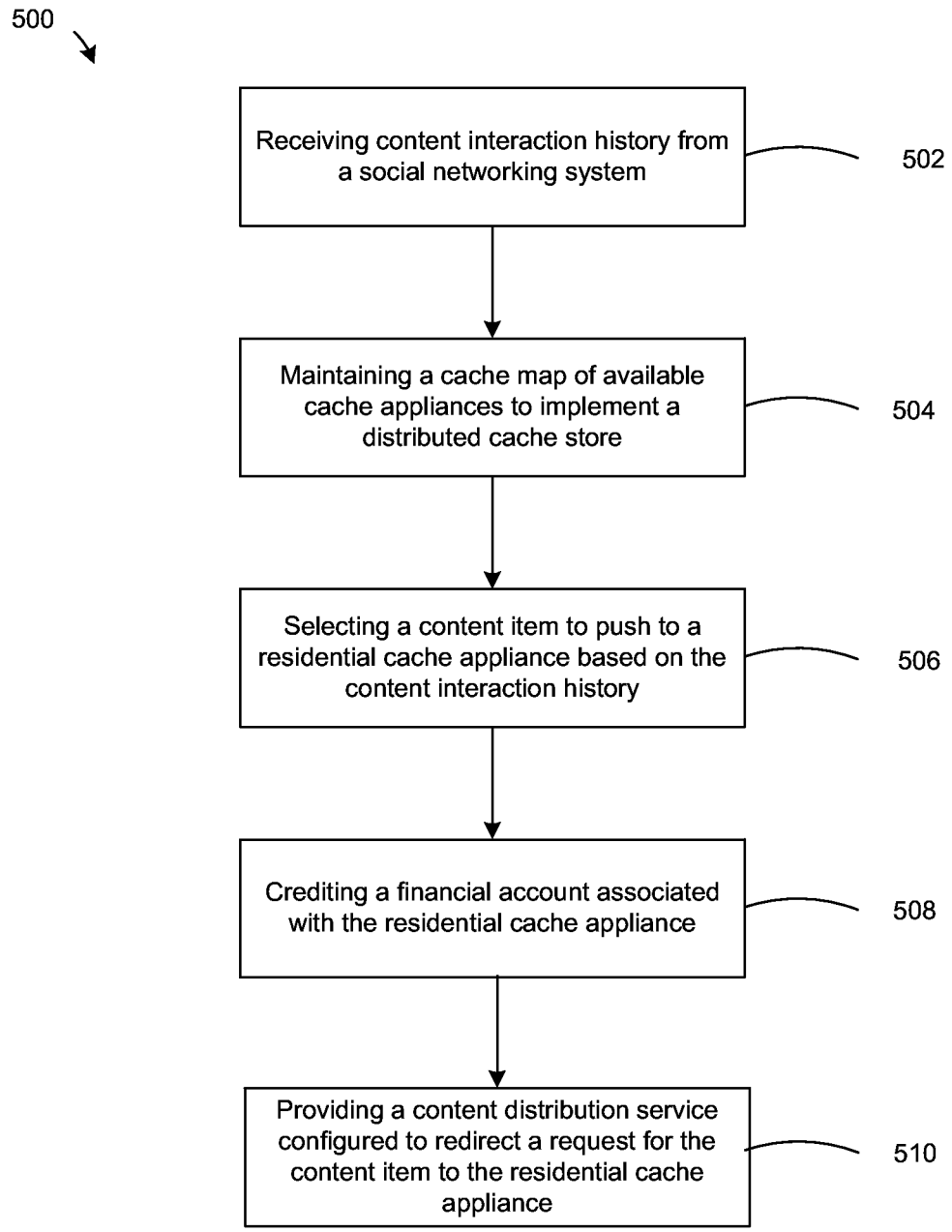
FIG. 5 is a flow chart of a method of operating a residential caching system to perform predictive caching utilizing a social networking system, in accordance with various embodiments.

FIG. 5 is a flow chart of a method 500 of operating a residential caching system (e.g., the residential caching system 100 of FIG. 1 or the residential caching system 200 of FIG. 1) to perform predictive caching utilizing a social networking system (e.g., the social networking system 102 of FIG. 1 or the social networking system 202 of FIG. 2), in accordance with various embodiments. At block 502, a content distribution system (e.g., the content distribution system 204 of FIG. 2) receives content interaction history (e.g., the interaction history 208 and/or the content request history 214 of FIG. 2) from the social networking system. The content interaction history includes one or more content-related activities associated with one or more content items and the social networking accounts (e.g., a first social networking account).

At block 504, the content distribution system and/or the social networking system maintains a cache map (e.g., the cache map 210 of FIG. 2) of available cache appliances to implement a distributed cache store. The cache appliances can be end-user devices or stand-alone devices within local networks connected to the end-user devices. In some embodiments, the cache map includes permission settings of the available cache appliances and/or social networking accounts associated therewith. The permission settings indicate whether a social networking account of the requester associated with the content streaming request is allowed to stream the requested content from the residential cache appliance.

At block 506, the content distribution system selects a content item to push to a residential cache appliance (e.g., the residential cache appliance 218 of FIG. 2) based on the content interaction history. Step 506 may include updating the cache map to associate a network address of the residential cache appliance with an identifier of the content item. In some embodiments, the content distribution system can retrieve the cache map from the social networking system.

The residential cache appliance can be associated a second social networking account of the social networking system. The content distribution system can select the second social networking account and thus the residential cache appliance of the second social networking account to service the content streaming request. The content distribution system can select the second social networking account because it is the first social networking account, because it is geographically proximate to the first social networking account according to location information stored in the social networking system, because it is connected to a local network utilized by the first social networking account, or because it is within an ego social network of the first social networking account according to the social networking system. An ego network is a subset of a social graph consists of a focal node ("ego"), the nodes to whom the ego is directly connected to, and the edges that connect the nodes to the ego.

The content item may be one of the content items described by the content interaction history. For example, the content interaction history can include a content presentation (e.g., displaying or playing) activity associated with the content item or another content item determined to be related (e.g., similar) to the content item.

In some embodiments, block 506 includes encrypting the content item with a corresponding cryptographic key available to the content distribution system or the social networking system. In some embodiments, block 506 includes adding an expiration timestamp to the content item such that, at a time beyond the expiration timestamp, the content item becomes inaccessible from the residential cache appliance. Both these features facilitate permission/privacy enforcement of the content item pushed to residential cache appliance. Because the content rights may belong to the content distribution system, the features enable the content distribution system to protect the content items stored in a residential cache appliance from those who possess the residential cache appliance.

In some embodiments, block 506 includes postponing a schedule to push the content item, in order to save on network cost. For example, the content distribution system can postpone pushing the content item until bandwidth becomes available. For another example, the content distribution system can postpone pushing the content item until a time when the internet service provider (ISP) charges a lesser or least amount. This feature is advantageous in regions where the common practice is for ISPs to charge for its service based on network bandwidth usage or based on time of day.

At block 508, the content distribution system credits a financial account associated with the residential cache appliance. In some embodiments, block 508 is in response to the residential cache appliance storing the content item. In some embodiments, block 508 is in response to the residential cache appliance serving the content item to another device according to the content interaction history received in block 502. This step may be advantageous to incentivize an owner of the residential cache appliance to share its content to alleviate the bandwidth of the content distribution service.

At block 510, the content distribution system provides a content distribution service configured to redirect a content streaming request for the content item to the residential cache appliance when the content item is determined to be available in the distributed cache store according to the cache map. In some embodiments, block 510 includes providing the network address of the residential cache appliance to a requester device such that the content item is retrievable from the residential cache appliance through a local network even when the requester device loses connection to the content distribution service.

Figure 6:
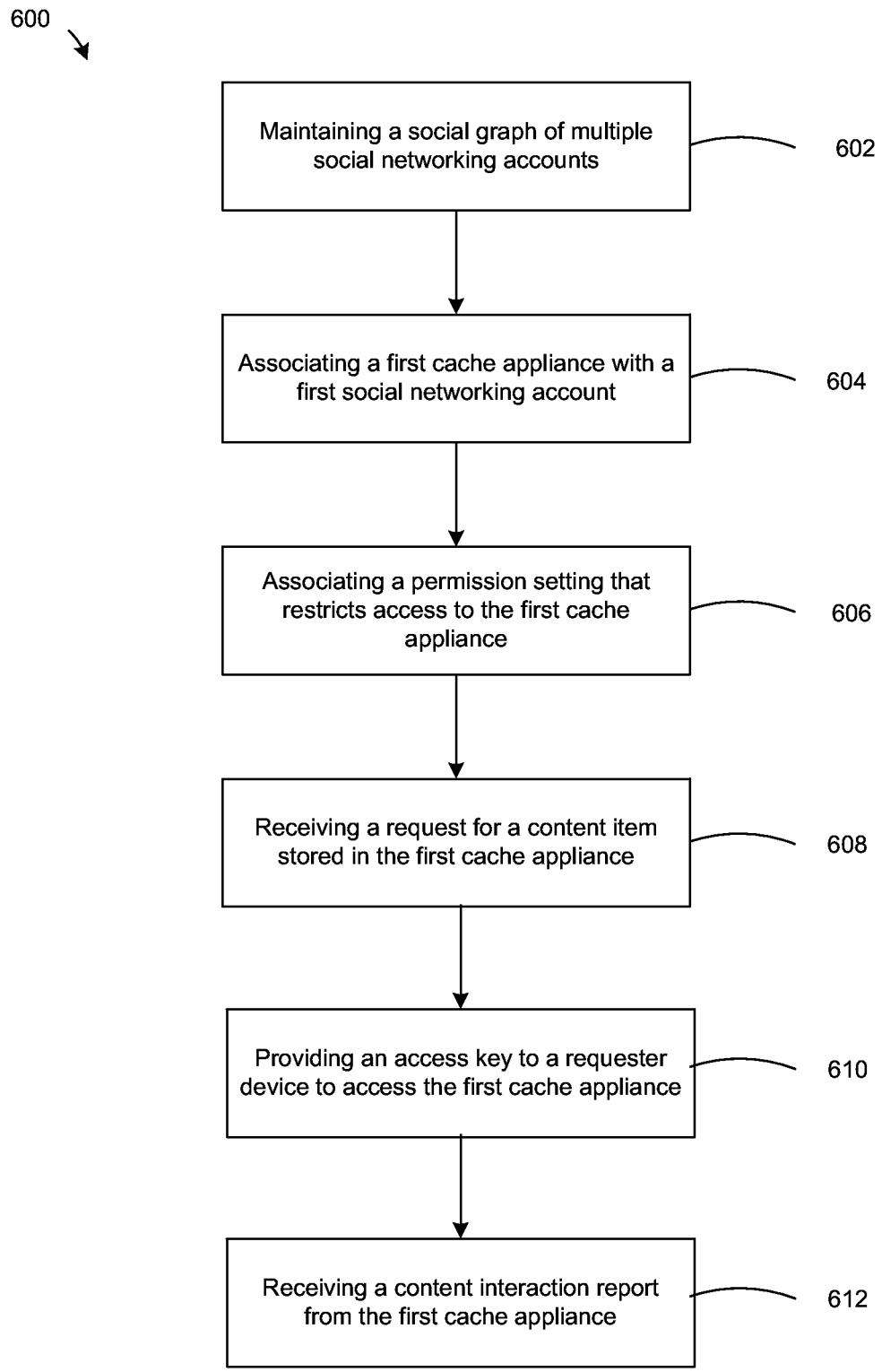
FIG. 6 is a flow chart of a method of operating a social networking system to facilitate predictive caching for a content distribution system, in accordance with various embodiments.

FIG. 6 is a flow chart of a method 600 of operating a social networking system (e.g., the social networking system 102 of FIG. 1 or the social networking system 202 of FIG. 2) to facilitate predictive caching for a content distribution system (e.g., the content distribution system 204 of FIG. 2), in accordance with various embodiments. Step 602 includes the social networking system maintaining a social graph (e.g., the social graph 206 of FIG. 2) of multiple social networking accounts. Then at block 604, the social networking system associates a first cache appliance (e.g., the residential cache appliance 218 of FIG. 2) and content items cached thereon with a first social networking account. At block 606, the social networking system receives and associates a permission setting that restricts access to the first cache appliance and/or specific content within the first cache appliance. The social networking system can receive the permission setting from the first social networking account through a social networking website interface or a social networking mobile application.

At block 608, the social networking system receives a request for a content item stored in the first cache appliance from a requester device (e.g., the requester device 222 of FIG. 2 or the content distribution system 204 acting as a proxy to the requester device 222) associated with a second social networking account. At block 610, the social networking system provides an access key to the requester device when the second social networking account is permitted to access the first cache appliance and the content item according to the permission setting. The access key can be configured to enable the requester device to obtain (e.g., stream) the content item directly from the first cache appliance. At block 612, the social networking system receives a content interaction report from the first cache appliance associated with the first social networking account and/or the requester device associated with the second social networking account.

While processes or methods are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times.

Figure 7:
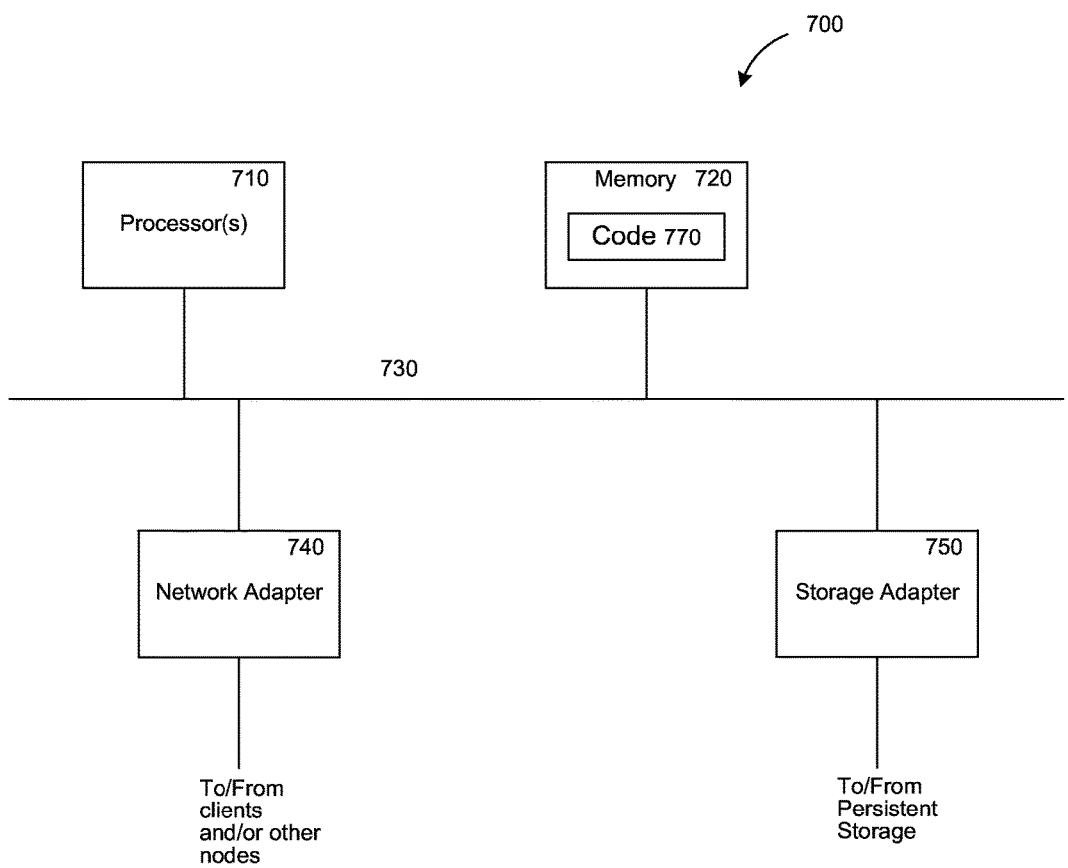
FIG. 7 is a block diagram of an example of a computing device, which may represent one or more computing device or server described herein, in accordance with various embodiments.

FIG. 7 is a block diagram of an example of a computing device 700, which may represent one or more computing device or server described herein, in accordance with various embodiments. The computing device 700 can be one or more computing devices that implement the social networking system 102 of FIG. 1, the social networking system 202 of FIG. 2, the social networking system 302 of FIG. 3, the content distribution system 204 of FIG. 2, the residential cache appliance 106, the requester device 128 of FIG. 1, the residential cache appliance 218, and the requester device 222 of FIG. 2. The computing device 700 includes one or more processors 710 and memory 720 coupled to an interconnect 730. The interconnect 730 shown in FIG. 7 is an abstraction that represents any one or more separate physical buses, point-to-point connections, or both connected by appropriate bridges, adapters, or controllers. The interconnect 730, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 710 is/are the central processing unit (CPU) of the computing device 700 and thus controls the overall operation of the computing device 700. In certain embodiments, the processor(s) 710 accomplishes this by executing software or firmware stored in memory 720. The processor(s) 710 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 720 is or includes the main memory of the computing device 700. The memory 720 represents any form of random access memory (RAM), read-only memory (ROM), flash memory, or the like, or a combination of such devices. In use, the memory 720 may contain a code 770 containing instructions according to the mesh connection system disclosed herein.

Also connected to the processor(s) 710 through the interconnect 730 are a network adapter 740 and a storage adapter 750. The network adapter 740 provides the computing device 700 with the ability to communicate with remote devices, over a network and may be, for example, an Ethernet adapter or Fibre Channel adapter. The network adapter 740 may also provide the computing device 700 with the ability to communicate with other computers. The storage adapter 750 enables the computing device 700 to access a persistent storage, and may be, for example, a Fibre Channel adapter or SCSI adapter.

The code 770 stored in memory 720 may be implemented as software and/or firmware to program the processor(s) 710 to carry out actions described above. In certain embodiments, such software or firmware may be initially provided to the computing device 700 by downloading it from a remote system through the computing device 700 (e.g., via network adapter 740).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic," as used herein, can include, for example, programmable circuitry programmed with specific software and/or firmware, special-purpose hardwired circuitry, or a combination thereof.

Some embodiments of the disclosure have other aspects, elements, features, and steps in addition to or in place of what is described above. These potential additions and replacements are described throughout the rest of the specification.

What is claimed is:

1. A computer-implemented method, comprising:
    receiving, at a social networking server system from a residential cache appliance associated with a first social networking account, an indication to share a content item, wherein receiving the indication includes:
        receiving, at the social networking server system, a network efficient representation of the content item that is uploaded by the residential cache appliance, wherein a privacy setting of the residential cache appliance is managed by the social networking server system;
        associating, at the social networking server system, a network address of the residential cache appliance with the network efficient representation of the content item;
        maintaining, at a storage associated with the social networking server system, a cache map of available residential cache appliances to implement a distributed cache store, wherein for one or more of the available residential cache appliances, the cache map identifies an associated social networking account, an associated network address, associated cache appliance stored content items, and associated privacy settings managed by the social networking server system;
        receiving, at the social networking server system and from a requester device associated with a second social networking account, a request for a full copy of the content item, wherein a second user associated with the requester device is a social connection of a first user associated with the residential cache appliance in a social graph of the social networking server system; and
        in response to the request, redirecting, by the social networking server system based on the cache map, the requester device to the residential cache appliance to obtain the full copy of the content item; wherein the residential cache appliance transmits in response to the redirection from the social networking server system, the full copy of the content item to the requester device.

2. The computer-implemented method of claim 1, wherein associating the network address includes associating the network efficient representation with the network address, the network address identifying the residential cache appliance as storing the content item.

3. The computer-implemented method of claim 2, further comprising: generating a user interface for other social networking accounts to request content associated with the first social networking account, wherein the user interface is configured to provide access to the network efficient representation stored in the social networking server system.

4. The computer-implemented method of claim 3, wherein the user interface is configured to provide an option for the social networking accounts to request the content item from the residential cache appliance; and wherein receiving the network efficient representation includes receiving a configuration of whether the user interface is to provide the option.

5. The computer-implemented method of claim 2, wherein receiving the network efficient representation is in response to determining that the content item is too large for the social networking system to store or to serve to external devices.

6. The computer-implemented method of claim 2, wherein receiving the network efficient representation includes instructing the residential cache appliance to generate the network efficient representation for the content item.

7. The computer-implemented method of claim 2, wherein the network efficient representation is a derivative content item generated from the content item.

8. The computer-implemented method of claim 7, wherein the network efficient representation is a lower resolution version, a lower sampling rate version, or a lower quality version of the content item.

9. The computer-implemented method of claim 2, wherein the network efficient representation is a symbolic or iconic representation of the content item that is not derived from the content item.

10. The computer-implemented method of claim 1, wherein redirecting the requester device includes verifying that the second social networking account has permission to access the content item in the residential cache appliance according to a permission policy associated with the first social networking account.

11. The computer-implemented method of claim 1, wherein redirecting the requester device includes sending a network address translation message to a domain name service (DNS) server to redirect the request for the content item to the residential cache appliance.

12. The computer-implemented method of claim 1, wherein redirecting the requester device to the residential cache appliance is in response to determining that a size of the content item exceeds a threshold size for an available network bandwidth of the social networking system to deliver the content item from the social networking system.

13. A computer-readable storage memory storing computer-executable instructions, comprising:
    instructions for receiving, at a content distribution system, content interaction history associated with multiple content items in a social networking system, wherein the content interaction history indicates an activity associated with each of the content items;
    instructions for generating, by the social networking system, an affinity score for each of the content items, wherein the affinity score is computed for a content item and a user account of the social networking system, wherein the affinity score indicates a user's affinity to the content item;

instructions for maintaining at a storage associated with the social networking system, a cache map of available residential cache appliances to implement a distributed cache store, wherein for one or more of the available residential cache appliances, the cache map identifies an associated social networking account, an associated network address, associated cache appliance stored content items, and associated privacy settings managed by the social networking system;

instructions for selecting, by the content distribution system based on the cache map, a residential cache appliance of the available residential cache appliances to push the content item, the residential cache appliance selected based on the affinity score of the content item, wherein pushing the content item includes updating the cache map to associate a network address of the residential cache appliance with an identifier of the content item; and instructions for redirecting, by the content distribution system, a request for the content item from a requesting device associated with a social networking account of the social networking system to the residential cache appliance at the network address when the content item is determined to be available in the distributed cache store according to the cache map, wherein a first user associated with the requester device is a social connection of a second user associated with the residential cache appliance in a social graph of the social networking server system.

14. The computer-readable storage memory of claim 13, wherein the content interaction history includes a content presentation activity associated with the content item or another content item determined to be similar to the content item.

15. The computer-readable storage memory of claim 13, wherein the residential cache appliance is associated a second social networking account that is determined to be the first social networking account, geographically proximate to the first social networking account, connected to a local network utilized by the first social networking account, or within an ego social network of the first social networking account according to the social networking system.

16. The computer-readable storage memory of claim 13, wherein cache map includes permission settings of the available cache appliances or social networking accounts associated therewith, wherein the permission settings indicate whether a second social networking account associated with the request is allowed to stream from the residential cache appliance.

17. The computer-readable storage memory of claim 13, further comprising instructions for crediting a financial account associated with the residential cache appliance in response to the residential cache appliance storing the content item or in response to the residential cache appliance serving the content item to another device according to the content interaction history.

18. The computer-readable storage memory of claim 13, wherein selecting the content item to push includes encrypting the content item with a cryptographic key available to the content distribution system or the social networking system or pushing the content item with an expiration timestamp beyond which the content item becomes inaccessible in the residential cache appliance.

19. The computer-readable storage memory of claim 13, wherein selecting the content item to push includes postponing to push the content item to save on network cost.

20. A social networking system comprising:
a processor; and
a memory storing instructions which, when executed by the processor, cause the processor to perform a method including:
maintaining a social graph of multiple social networking accounts, the social graph including a first social networking account associated with a first cache appliance of multiple cache appliances and a permission setting that restricts access to the first cache appliance and a set of content items stored within the first cache appliance, wherein each of the multiple cache appliances is associated with a social networking account of the multiple social networking accounts and stores a subset of multiple content items, the multiple content items associated with the multiple social networking accounts, wherein the set of content items are stored in the first cache appliance based on an affinity score of the set of content items, and wherein privacy settings of the multiple cache appliances are managed by the social networking server system;
maintaining a cache map of available residential cache appliances to implement a distributed cache store, wherein for one or more of the available residential cache appliances, the cache map identifies an associated social networking account, an associated network address, associated cache appliance stored content items, and associated privacy settings managed by the social networking system;
receiving a request for a content item stored in the first cache appliance from a requester device associated with a second social networking account, wherein a second user associated with the requester device is a social connection of a first user associated with the first cache appliance in a social graph of the social networking server system;
providing an access key to the requester device when the second social networking account is permitted to access the first cache appliance and the content item according to the permission setting, wherein the access key is configured to enable the requester device to obtain the content item directly from the first cache appliance based on the cache map; and
receiving a content interaction report from the first cache appliance associated with the first social networking account and the requester device associated with the second social networking account.

* * * * *